(12) United States Patent
Yamaguchi et al.

(10) Patent No.: US 6,807,237 B1
(45) Date of Patent: Oct. 19, 2004

(54) RADIO APPARATUS AND TRANSMISSION/RECEPTION METHOD

(75) Inventors: Manabu Yamaguchi, Yokohama (JP); Toshio Obara, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/701,697

(22) PCT Filed: Mar. 28, 2000

(86) PCT No.: PCT/JP00/01910

§ 371 (c)(1),
(2), (4) Date: Dec. 1, 2000

(87) PCT Pub. No.: WO00/60758

PCT Pub. Date: Oct. 12, 2000

(30) Foreign Application Priority Data

Apr. 2, 1999 (JP) .............................................. 11-97035

(51) Int. Cl.[7] .............................. H03D 3/18; H04L 27/22
(52) U.S. Cl. ........................ 375/328; 375/316; 375/327; 375/324; 375/328
(58) Field of Search .............................. 375/219, 347, 375/316–351; 455/553.1

(56) References Cited

U.S. PATENT DOCUMENTS

| | | | | |
|---|---|---|---|---|
| 5,327,582 A | * | 7/1994 | Wong ........................... | 455/76 |
| 5,953,641 A | * | 9/1999 | Auvray ........................ | 455/74 |
| 5,970,053 A | * | 10/1999 | Schick et al. ................ | 370/252 |
| 6,075,823 A | * | 6/2000 | Sonoda ........................ | 375/267 |
| 6,154,166 A | * | 11/2000 | Sawada et al. ............... | 342/20 |

FOREIGN PATENT DOCUMENTS

| | | |
|---|---|---|
| EP | 0878916 | 11/1998 |
| JP | 4021220 | 1/1992 |
| JP | 06164491 | 6/1994 |
| JP | 08139640 | 5/1996 |
| JP | 10322407 | 12/1998 |
| JP | 11004211 | 1/1999 |

OTHER PUBLICATIONS

Korean Office Action dated Aug. 30, 2002.
English translation of Korean Office Action.
PCT International Search Report dated May 2, 2000.

* cited by examiner

Primary Examiner—Stephen Chin
Assistant Examiner—Jason M. Perilla
(74) Attorney, Agent, or Firm—Stevens, Davis, Miller & Mosher, LLP

(57) ABSTRACT

At the time of ordinary communication, up-mixer 108 combines a signal with a frequency f2 from frequency synthesizer 124 with I and Q signals for transmission that are quadrature modulated in quadrature modulator 105, down-mixer 115 combines the signal with the frequency f2 with a received signal, then only in the case of receiving a signal with a frequency fr' different from a frequency fr, frequency synthesizer 125 that generates a signal with a frequency f3 different from the frequency f2 is operated, and frequency synthesizer 125 and down-mixer 115 are connected with switch 127, so that down-mixer 115 combines the signal with the frequency f3 with a received signal. It is thereby possible to switch frequencies fast and with low current consumption in receiving a signal with a reception frequency other than a combination of transmission frequency and reception frequency specified in an ordinary radio system.

8 Claims, 7 Drawing Sheets

RADIO APPARATUS AND TRANSMISSION/RECEPTION METHOD

This is a national filing under 35 U.S.C 371 based on PCT/JP00/0191 filed Mar. 28, 2000 which claims priority to JP11-097035 filed Apr. 2, 1999.

TECHNICAL FIELD

The present invention relates to a radio apparatus used in a digital mobile communication system and the like, and more particularly, to a radio apparatus and transmission/reception method used in a CDMA (Code Division Multiple Access) mobile communication system.

BACKGROUND ART

FIG. 1 is a block diagram illustrating a configuration of a conventional radio apparatus. The conventional radio apparatus illustrated in FIG. 1 is used in a radio system such that a reception frequency is only switched to another frequency at the time a transmission signal is transmitted so as to obtain a level measurement on a reception frequency channel that is different from an ordinary transmission/reception frequency combination and further obtain system control information.

Radio apparatus 10 is provided with D/A converters 11 and 12 to which I channel data and Q channel data (hereinafter, respectively referred to as I data and Q data) is respectively input, low-pass filters 13 and 14, quadrature modulator 15, gain control amplifier 16, band-pass filter 17, up-mixer 18, band-pass filter 19, and power amplifier 20. Radio apparatus 10 is further provided with antenna duplexer 21 and antenna 22. Radio apparatus 10 is furthermore provided with low noise amplifier 23, band-pass filter 24, down-mixer 25, band-pass filter 26, gain control amplifier 27, quadrature demodulator 28, low-pass filters 29 and 30, and A/D converters 31 and 32 that respectively output I data and Q data. Still furthermore, radio apparatus 10 is provided with transmission IF (intermediate) frequency synthesizer 33, transmission RF (radio) frequency synthesizer 34, reception RF frequency synthesizer 35, and reception IF synthesizer 36.

The next explanation is given of the transmission processing operation in radio apparatus 10.

I data and Q data to be transmitted is converted into respective analog signals in D/A converters 11 and 12, subjected to low-pass filtering in low-pass filters 13 and 14, and then converted in quadrature modulator 15 into a signal with a transmission IF frequency using a signal generated from transmission IF frequency synthesizer 33, respectively.

The converted signal with the transmission IF frequency is amplified in gain control amplifier 16 corresponding to a control voltage, filtered in band-pass filter 17 to pass a signal with a predetermined frequency band, and then converted in up-mixer 18 into a signal with a transmission RF frequency using a signal generated from transmission RF frequency synthesizer 34.

The converted signal with the transmission RF frequency is filtered in band-pass filter 19 to pass a signal with a predetermined frequency band, amplified in power amplifier 20, and output to antenna duplexer 21 that separates a transmission frequency signal and reception frequency signal, whereby the radio signal is transmitted from antenna 22.

The next explanation is given of the reception processing operation in radio apparatus 10.

A quadrature modulated signal with a reception frequency received at antenna 22 is output to antenna duplexer 21 which separates a transmission frequency signal and reception frequency signal. The resultant signal is subjected to low noise amplification in low noise amplifier 23, filtered in band-pass filter 24 to pass a signal with a predetermined frequency band, and then converted in down-mixer 25 into a signal with a reception IF frequency using a signal generated from reception RF frequency synthesizer 35.

The converted signal with the reception IF frequency is filtered in band-pass filter 26 to pass a signal with a predetermined frequency band, amplified in gain control amplifier 27 corresponding to a control voltage, subjected to quadrature demodulation in quadrature demodulator 28 using a signal generated in reception IF frequency synthesizer 36, and then demodulated to an I signal and Q signal.

The I signal and Q signal are subjected to low-pass filtering in low-pass filters 29 and 30, and converted into respective digital signals in A/D converters 31 and 32, respectively, whereby I data and Q data are output.

It is herein assumed that a transmission RF frequency is ft, a reception RF frequency is fr, and that the ft and fr have a relationship of fr>ft, the transmission RF frequency and reception RF frequency are specified so that fr minus ft (fr–ft) is constant.

Accordingly, assuming that a frequency of transmission IF frequency synthesizer 33 is f1, a frequency of transmission RF synthesizer 34 is f2, a frequency of reception RF synthesizer 35 is f3, and that a frequency of reception IF frequency synthesizer 36 is f4, the transmission RF frequency ft is expressed with f2–f1 or f2+f1, the reception RF frequency fr is expressed with f3–f4 or f3+f4, and f2 equals f3 (f2=f3) at the time of the ordinary operation where fr–ft is constant.

When a signal is received which has a reception RF frequency fr' where fr-ft is not constant, i.e., when f2>f3 or f2<f3, the frequency of reception RF synthesizer 35 is switched corresponding to the reception frequency fr' that is different from fr. In this case, a quadrature modulated signal with the reception frequency fr' received at antenna 22 is output to antenna duplexer 21 while being separated from a signal with the transmission frequency, subjected to low noise amplification in low noise amplifier 23, filtered in band-pass filter 24 to pass a signal with a predetermined frequency band, and subjected to frequency conversion in down-mixer 25 using a signal with a frequency generated in reception RF frequency synthesizer 35 corresponding to the reception frequency fr' so that the reception frequency is the same as a case that the reception IF frequency is fr.

In the above-mentioned conventional apparatus, however, when a signal is received which has a frequency different from usually specified one in a communication, it is necessary to fast switch a frequency of reception RF frequency synthesizer 35, and further to concurrently operate reception RF frequency synthesizer 35 and transmission RF frequency synthesizer 34, thereby resulting in a problem that current consumption becomes great.

DISCLOSURE OF INVENTION

It is an object of the present invention to provide a radio apparatus and transmission/reception method capable of performing frequency switching fast and with low current consumption in the case of receiving a signal with a frequency different from ordinary specified one.

This object is achieved by generating in a common frequency synthesizer a first frequency signal with a transmission frequency and reception frequency combined, generating in a reception frequency synthesizer a second frequency signal with a frequency different from that of the first frequency signal, combining in a transmission mixer the first frequency signal and quadrature modulated transmission I and Q signals, and at the time of ordinary communications, combining in a reception mixer the first frequency signal and a received signal, while only at the time of receiving a signal with a frequency different from the first frequency, operating the reception frequency synthesizer to combine the received signal with the second frequency signal.

BEST MODE FOR CARRYING OUT THE INVENTION

Embodiments of the present invention are explained below with reference to accompanying drawings.

(First Embodiment)

Figure 2:
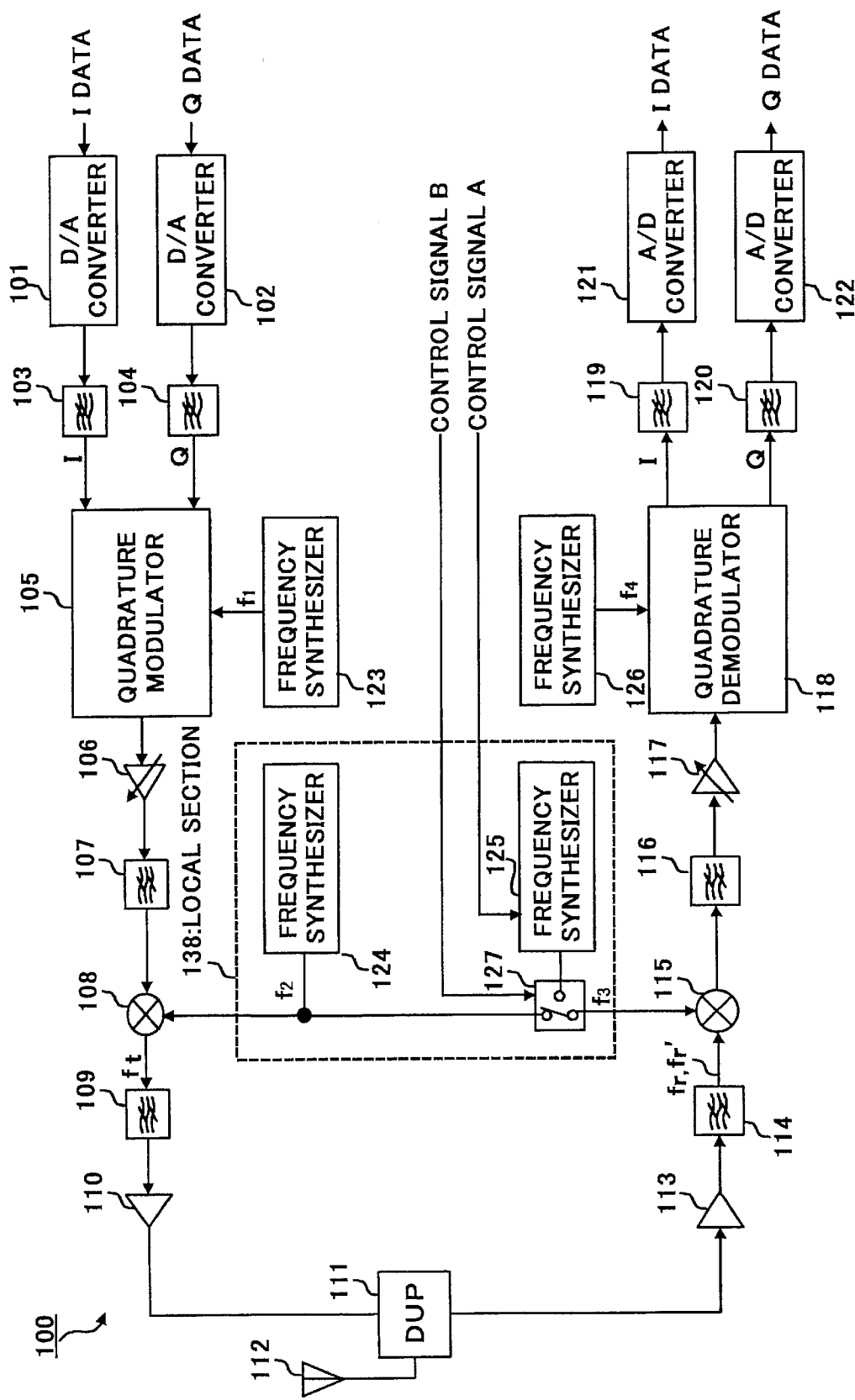
FIG. 2 is a block diagram illustrating a configuration of a radio apparatus according to a first embodiment of the present invention.

FIG. 2 is a block diagram illustrating a configuration of a radio apparatus according to the first embodiment of the present invention. Radio apparatus 100 illustrated in FIG. 2 is used for a mobile station apparatus and the like in a digital mobile communication system.

Radio apparatus 100 is provided with D/A converters 101 and 102 to which I data and Q data is input respectively, low-pass filters 103 and 104, quadrature modulator 105, gain control amplifier 106, band-pass filter 107, up-mixer 108, band-pass filter 109, and power amplifier 110. Radio apparatus 100 is further provided with antenna duplexer 111 and antenna 112. Radio apparatus 100 is furthermore provided with low noise amplifier 113, band-pass filter 114, down-mixer 115, band-pass filter 116, gain control amplifier 117, quadrature demodulator 118, low-pass filters 119 and 120, and A/D converters 121 and 122. Still furthermore, radio apparatus 100 is provided with transmission IF frequency synthesizer 123, transmission RF frequency synthesizer 124, reception RF frequency synthesizer 125, reception IF frequency synthesizer 126, and switch 127.

Moreover, a local section 138 is comprised of transmission RF frequency synthesizer 124, reception RF frequency synthesizer 125 and switch 127. A control signal A is provided to reception RF frequency synthesizer 125, and a control signal B is provided to switch 127.

It is assumed in the following explanation that a transmission RF frequency is ft, a reception RF frequency is fr, a frequency of transmission IF frequency synthesizer 123 is f1, a frequency of transmission RF frequency synthesizer 124 is f2, a frequency of reception RF frequency synthesizer 125 is f3, a frequency of reception IF frequency synthesizer 126 is f4, fr is larger than ft (fr>ft), the reception RF frequency fr equals f3 minus f4 (fr=f3−f4), the transmission RF frequency ft equals f2 minus f1 (ft=f2−f1) that is an upper (upper limit side) local frequency structure, and a reception RF frequency fr' that is different from the frequency at the time of ordinary communication equals f3 minus f4 (fr'=f3−f4) that is a lower (lower limit side) local frequency structure. In addition, the upper and lower are reversible.

The following explanation is given of the transmission processing operation in radio apparatus 100 at the time of the ordinary communication where fr minus ft (fr−ft) is constant. I data and Q data to be transmitted is converted into analog signals in D/A converters 101 and 102, subjected to low-pass filtering in low-pass filters 103 and 104, and then converted in quadrature modulator 105 into a signal with the transmission IF frequency f1 using a signal with the frequency f1 generated in transmission IF frequency synthesizer 133, respectively.

The converted signal with the transmission IF frequency is amplified in gain control amplifier 106 corresponding to a control voltage, filtered in band-pass filter 107 to pass a signal with a predetermined frequency band, and then converted in up-mixer 108 into a signal with the transmission RF frequency (ft=f2−f1) using a signal with the frequency f2 generated in transmission RF frequency synthesizer 124.

The converted signal with the transmission RF frequency is filtered in band-pass filter 109 to pass a signal with a predetermined frequency band, and amplified in power amplifier 110, and output to antenna duplexer 111 that separates a transmission frequency signal and reception frequency signal, whereby the radio signal is transmitted from antenna 112.

The explanation is next given of the reception processing operation in radio apparatus 100 at the time of the ordinary communication where fr minus ft (fr−ft) is constant. At this point, switch 127 connects reception RF frequency synthesizer 124 and down-mixer 115 according to the control signal B, and reception RF frequency synthesizer 125 is turned off with the control signal A.

A quadrature modulated signal received at antenna 112 is output to antenna duplexer 111 which separates the transmission frequency signal and reception frequency signal. The resultant signal is subjected to low noise amplification in low noise amplifier 113, filtered in band-pass filter 114 to pass a signal with a predetermined frequency band, and then converted in down-mixer 115 into a signal with the reception IF frequency f4 (f4=f2−fr) using a signal with the frequency f2 generated in transmission RF frequency synthesizer 124.

The converted signal with the reception IF frequency f4 is filtered in band-pass filter 116 to pass a signal with a predetermined frequency band, amplified in gain control amplifier 117 corresponding to a control voltage, subjected to quadrature demodulation in quadrature demodulator 118 using a signal with the frequency f4 generated in reception IF frequency synthesizer 126, and thereby demodulated to an I signal and Q signal.

The I and Q signals are subjected to low-pass filtering in low-pass filters 119 and 120, and converted into respective digital signals in A/D converters 121 and 122, respectively, whereby I data and Q data is output.

The explanation is next given of the operation of local section 138 when the apparatus receives a signal with the reception frequency fr' such that fr minus ft (fr−ft) is not constant, while transmitting a signal with the transmission RF frequency ft.

Transmission RF frequency synthesizer 124 in Local section 138 outputs a signal with the transmission RF frequency ft such that fr minus ft is constant using a signal with the frequency f2.

Reception RF frequency synthesizer 125 is turned on with the control signal A, and generates a signal with the frequency f3 such that f3 minus fr' equals f4 (f4=f3−fr'). Switch 127 is controlled with the control signal B in synchronism with a timing at which a reception is started so as to connect reception RF frequency synthesizer 125 and down-mixer 115.

Down-mixer 115 multiplies an output signal from band-pass filter 114 by a signal with the frequency f4 generated in reception RF frequency synthesizer 125.

Thus, when the ordinary communication is performed, a signal generated in transmission RF frequency synthesizer 124 is output to up-mixer 108, while being output to down-mixer 115 through switch 127. Then, only in the case of receiving a signal with a frequency different from that in the ordinary communication, reception RF frequency synthesizer 125 is operated, and reception RF frequency synthesizer 125 and down-mixer 115 are connected by switch 127. According to the foregoing, since it is only required to operate a single RF frequency synthesizer at the time of the ordinary communication, it is possible to reduce the current consumption as compared to the conventional case that requires two RF frequency synthesizers to be operated.

(Second Embodiment)

Figure 3:
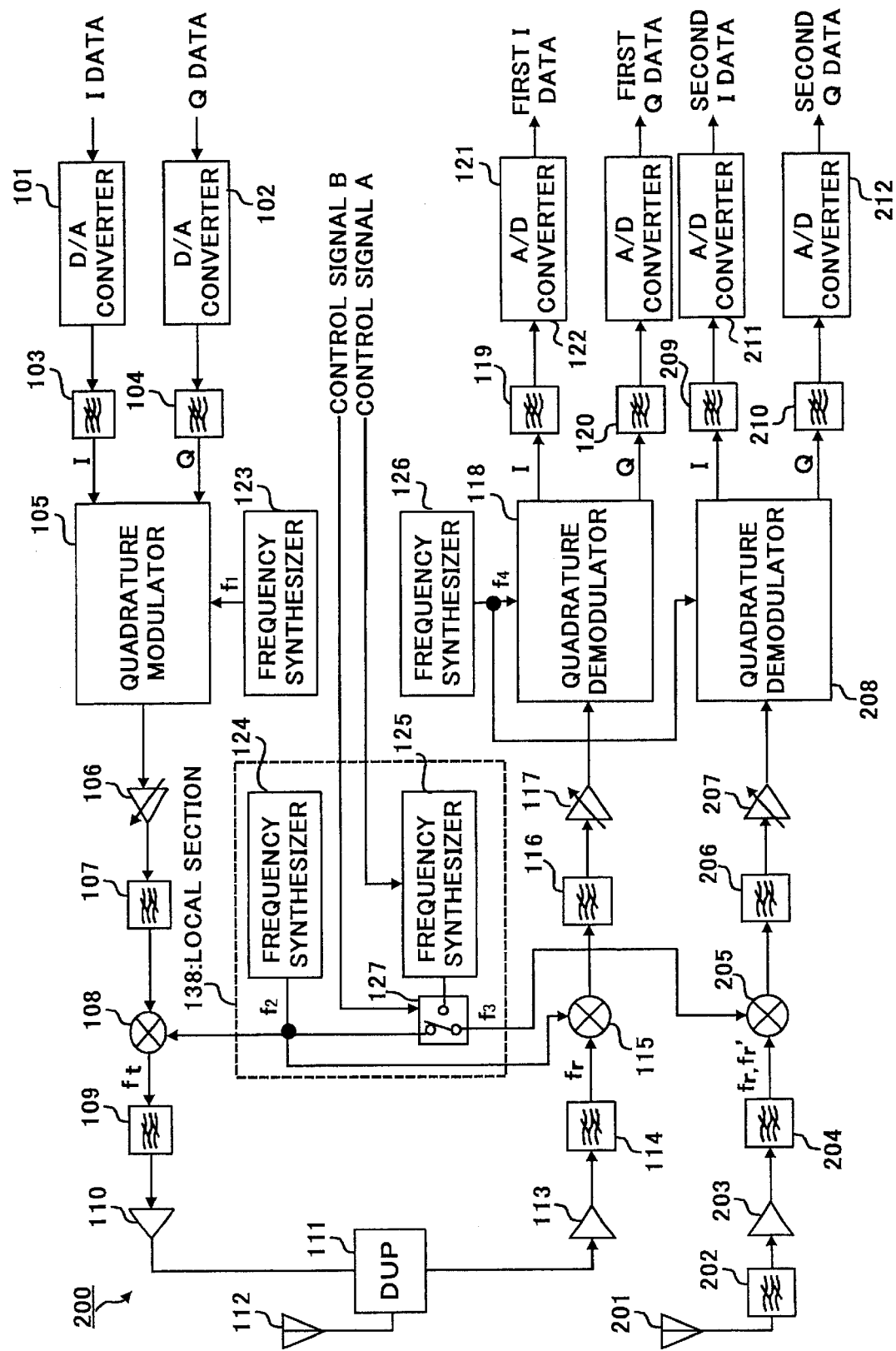
FIG. 3 is a block diagram illustrating a configuration of a radio apparatus according to a second embodiment of the present invention.

FIG. 3 is a block diagram illustrating a configuration of a radio apparatus according to the second embodiment of the present invention. In addition, in radio apparatus 200 in FIG. 3, structural sections common to radio apparatus 100 in FIG. 2 are assigned the same reference numerals as in FIG. 2 to omit the explanation thereof.

A feature of the second embodiment is that the radio apparatus is provided with two reception systems to enable itself to concurrently receive signals with different frequencies.

Radio apparatus 200 illustrated in FIG. 3 has, in addition to the configuration of radio apparatus 100 in FIG. 2, antenna 201, band-pass filter 202, low noise amplifier 203, band-pass filter 204, down-mixer 205, band-pass filter 206, gain control amplifier 207, quadrature demodulator 208, low-pass filters 209 and 210, and A/D converters 211 and 212. Then, in radio apparatus 200, down-mixer 205 is connected to switch 127, and down-mixer 115 is connected to transmission RF frequency synthesizer 124.

In the ordinary communication in which fr minus ft is constant, switch 127 connects transmission RF frequency synthesizer 124 and down-mixer 205 corresponding to the control signal B, and reception RF frequency synthesizer 125 is turned off with the control signal A.

In this case, a quadrature modulated signal received at antenna 201 is filtered in band-pass filter 202 to pass a signal with a predetermined frequency band, subjected to low noise amplification in low noise amplifier 203, filtered in band-pass filter 204 to pass a signal with a predetermined frequency band, and then converted in down-mixer 205 into a signal with the reception IF frequency f4 (f4=f2-fr) using a signal with the frequency f2 generated in transmission RF frequency synthesizer 124.

The converted signal with the reception IF frequency f4 is filtered in band-pass filter 206 to pass a signal with a predetermined frequency band, amplified in gain control amplifier 207 corresponding to a control voltage, subjected to quadrature demodulation in quadrature demodulator 208 using a signal with the frequency f4 generated in reception IF frequency synthesizer 126, and thereby modulated to a second I signal and second Q signal.

The converted second I and Q signals are subjected to low-pass filtering in low-pass filters 209 and 210, and converted into respective digital signals in A/D converters 211 and 212, respectively, whereby second I data and second Q data is output.

Since it is thereby possible for down-mixer 115 and down-mixer 205 to use the same frequency as the reception RF frequency of which a signal is multiplied in each mixer, two reception systems can receive signals with the same frequencies, and thereby can perform reception diversity.

The explanation is next given of the operation of local section 138 when the apparatus receives a signal with the reception frequency fr' that is different from a frequency in the ordinary communication, while transmitting a signal with the transmission RF frequency ft.

Transmission RF frequency synthesizer 124 in Local section 138 outputs a signal with the transmission RF frequency ft such that fr minus ft is constant using a signal with the frequency f2.

Down-mixer 115 multiplies an output signal from band-pass filter 114 by a signal with the frequency f2 generated in transmission RF frequency synthesizer 124, in the same way as the operation in the ordinary commination in which fr minus ft is constant.

Reception RF frequency synthesizer 125 is turned on with the control signal A, and generates a signal with the frequency f3 such that f3 minus fr' equals f4 (f4=f3−fr'). Switch 127 is controlled with the control signal B in synchronism with a timing at which a reception is started so as to connect reception RF frequency synthesizer 125 and down-mixer 205.

Down-mixer 205 multiplies an output signal from band-pass filter 204 by a signal with the frequency f4 generated in reception RF frequency synthesizer 125.

Thus, a plurality of reception systems is provided and one of the reception systems is configured in the same way as in the first embodiment, whereby it is possible to improve reception characteristics by performing diversity reception at the time of the ordinary communication, and further to decrease the current consumption.

In addition, it may be possible to connect down-mixer 115 to switch 127 in the same way as in the first embodiment and further connect down-mixer 205 to transmission RF frequency synthesizer 124, which is capable of operating in the same way as in the above configuration.

(Third Embodiment)

A feature of the third embodiment is to enable two reception systems to concurrently receive signals with frequencies different from the frequency in the ordinary communication.

Figure 4:
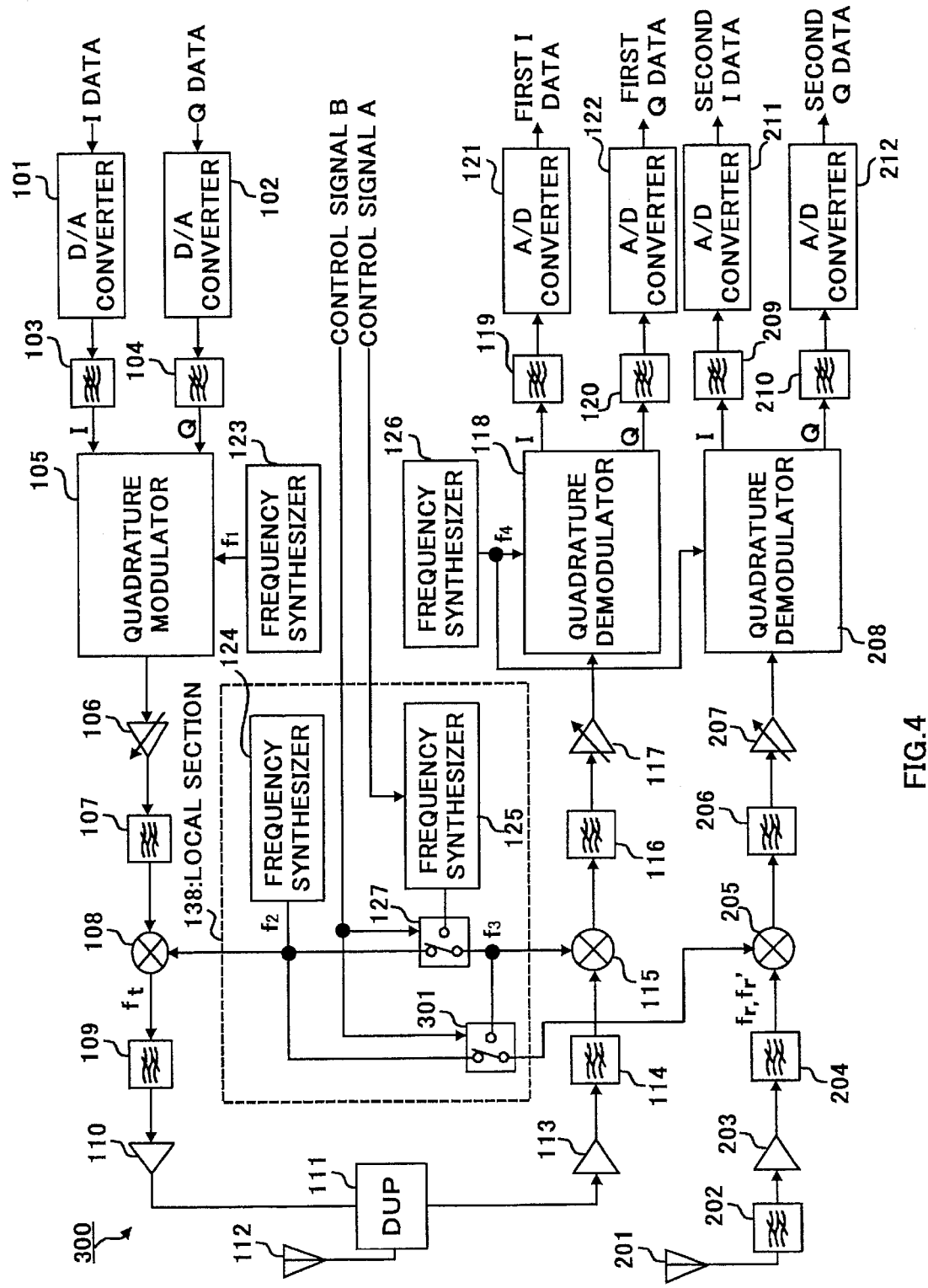
FIG. 4 is a block diagram illustrating a configuration of a radio apparatus according to a third embodiment of the present invention.

FIG. 4 is a block diagram illustrating a configuration of a radio apparatus according to the third embodiment of the present invention. In addition, in radio apparatus 300 in FIG. 4, structural sections common to radio apparatus 200 in FIG. 3 are assigned the same reference numerals as in FIG. 3 to omit the explanation thereof.

Radio apparatus 300 illustrated in FIG. 4 has switch 301 of which the switching is controlled with the control signal B, in addition to the configuration of radio apparatus 200 in FIG. 3, where down-mixer 115 is connected to switch 127, and down-mixer 205 is connected to switch 301.

In such a configuration, the operation in radio apparatus 300 at the time of the ordinary communication where fr minus ft is constant is the same as that in radio apparatus 200 explained in the second embodiment.

The explanation is next given of the operation of local section 138 when the apparatus receives a signal with the reception frequency fr' that is different from a frequency in the ordinary communication, while transmitting a signal with the transmission RF frequency ft.

Transmission RF frequency synthesizer 124 in Local section 138 outputs a signal with the transmission RF frequency ft such that fr minus ft is constant using a signal with the frequency f2.

Reception RF frequency synthesizer 125 is turned on with the control signal A, and generates a signal with the frequency f3 such that f3 minus fr' equals f4 (f4=f3−fr'). Then, with the control signal B in synchronism with a timing at which a reception is started, switch 127 is controlled to connect reception RF frequency synthesizer 125 and down-mixer 115, and switch 301 is controlled to connect reception RF frequency synthesizer 125 and down-mixer 205.

Down-mixer 115 multiplies an output signal from band-pass filter 114 by a signal with the frequency f4 generated in reception RF frequency synthesizer 125, and down-mixer 205 multiplies an output signal from band-pass filter 204 by the signal with the frequency f4 generated in reception RF frequency synthesizer 125.

Thus, a plurality of reception systems is provided and all of the reception systems are configured in the same way as in the first embodiment, whereby it is possible to improve reception characteristics by performing diversity reception also at the time of receiving a signal with a frequency different from that in the ordinary communication besides at the time of the ordinary communication.

(Fourth Embodiment)

Figure 1:
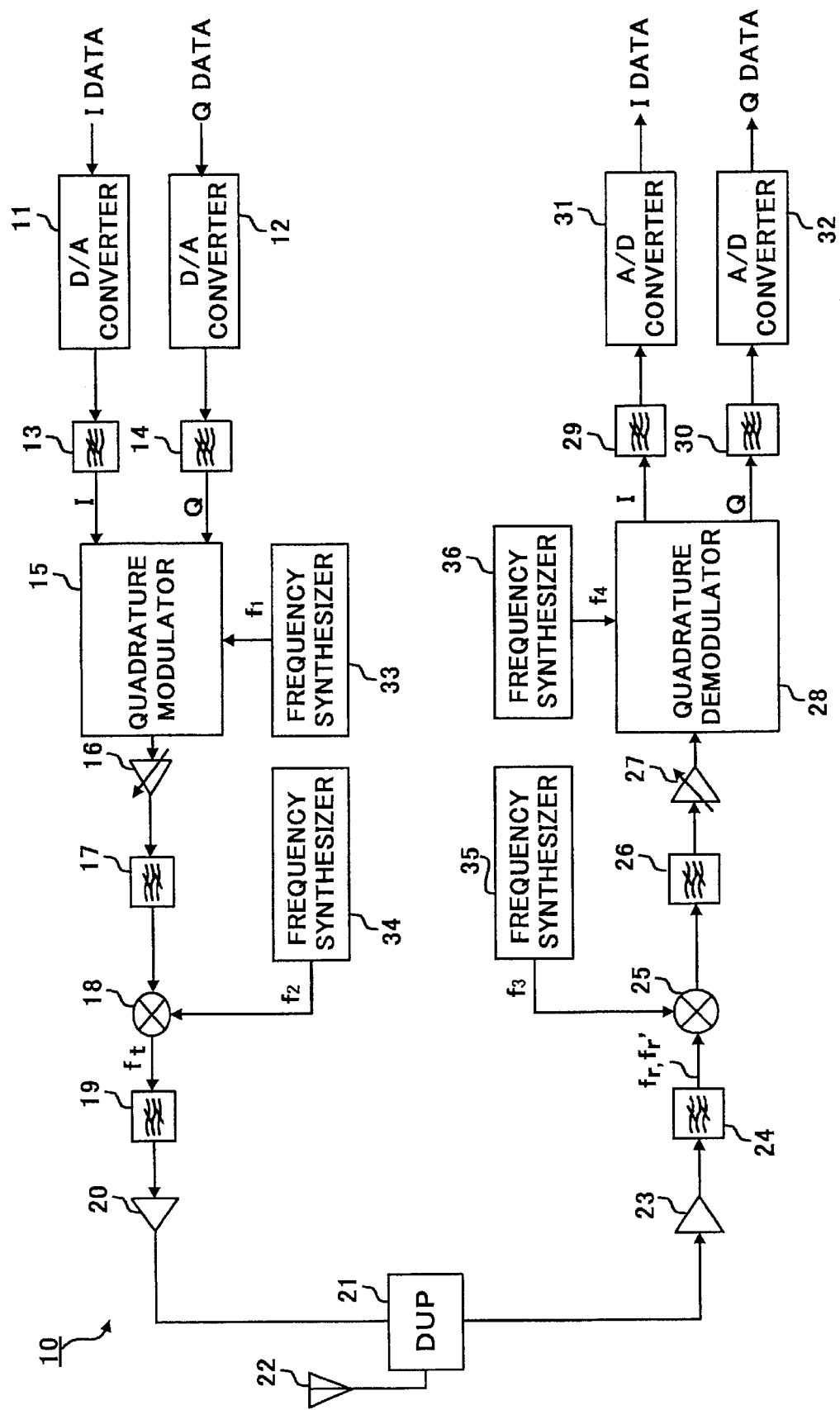
FIG. 1 is a block diagram illustrating a configuration of a conventional radio apparatus.
Figure 5:
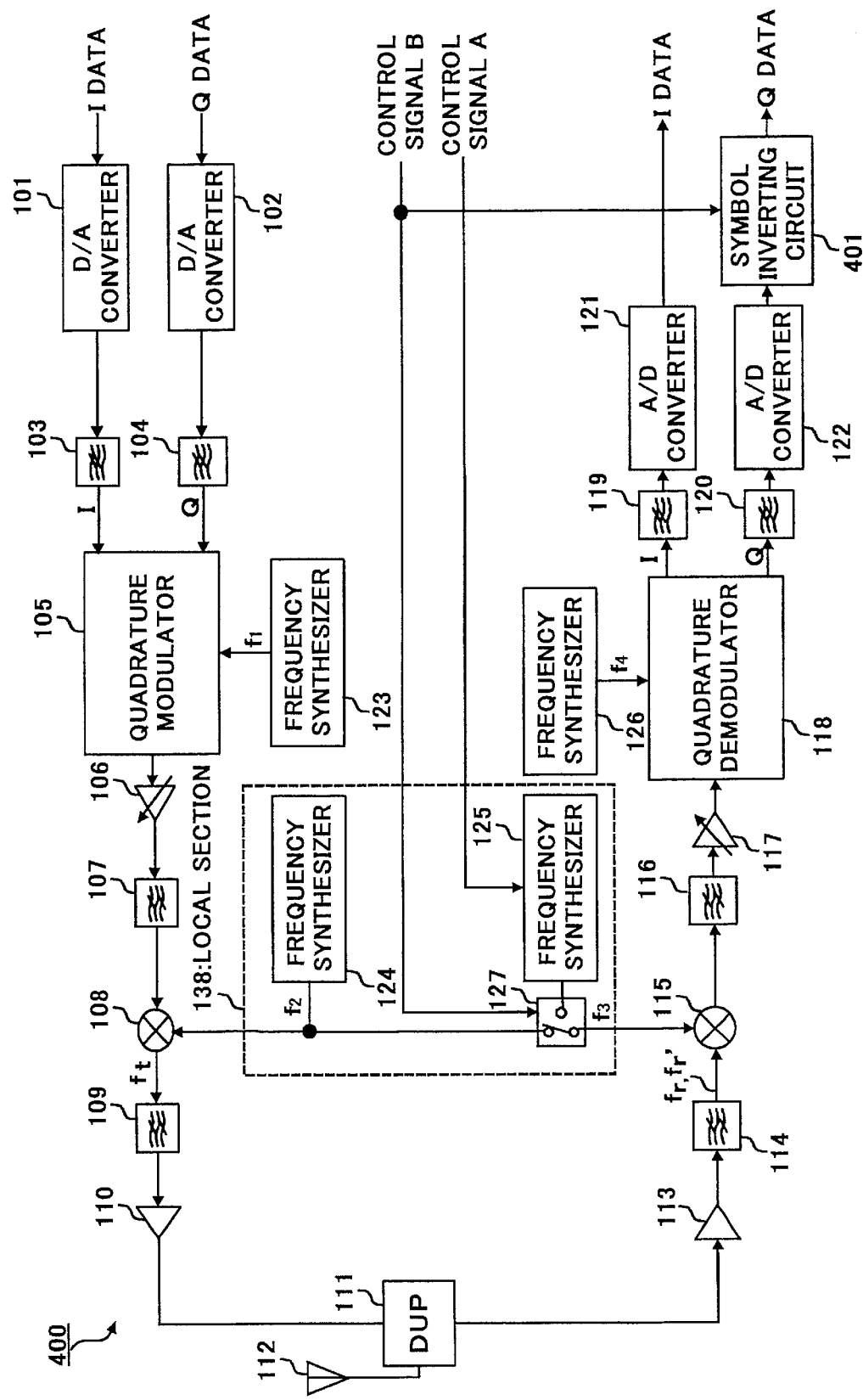
FIG. 5 is a block diagram illustrating a configuration of a radio apparatus according to a fourth embodiment of the present invention.

FIG. 5 is a block diagram illustrating a configuration of a radio apparatus according to the fourth embodiment of the present invention. In addition, in radio apparatus 400 illustrated in FIG. 5, structural sections common to radio apparatus 100 in FIG. 2 are assigned the same reference numerals as in FIG. 2 to omit the explanation thereof. Radio apparatus 400 illustrated in FIG. 5 has symbol inverting circuit 401 in addition to the configuration of radio apparatus 100 in FIG. 1.

The operation of radio apparatus 400 at the time of the ordinary communication where fr minus ft is constant is the same as that in radio apparatus 100 except that symbol inverting circuit 401 is set to its non-inverting state with the control signal B.

The explanation is next given of the operation of local section 138 when the apparatus receives a signal with the reception frequency fr' such that fr minus ft is not constant, while transmitting a signal with the transmission RF frequency ft.

Transmission RF frequency synthesizer 124 in Local section 138 outputs a signal with the transmission RF frequency ft such that fr minus ft is constant using a signal with the frequency f2.

Reception RF frequency synthesizer 125 is turned on with the control signal A, and generates a signal with the frequency f3 such that f3 minus fr' equals f4 (f4=f3−fr'). Switch 127 is controlled with the control signal B in synchronism with a timing at which a reception is started to connect reception RF frequency synthesizer 125 and down-mixer 115.

Down-mixer 115 multiplies an output signal from band-pass filter 114 by a signal with the frequency f4 generated in reception RF frequency synthesizer 125.

At this point, symbol inverting circuit 401 is set to its inverting state with the control signal B.

Thus, since symbol inverting circuit 401 is provided in addition to the configuration of the first embodiment, it is possible to adopt a large frequency difference between the frequency f2 of transmission RF frequency synthesizer 124 and the frequency f3 of reception RF frequency synthesizer 125. Therefore, in addition to obtaining the same effect as in the first embodiment, it is possible to reduce the intermodulation between the f2 and f3 when the frequency synthesizers 124 and 125 concurrently operate.

In addition, the fourth embodiment may be combined with any of the second embodiment and third embodiment.

Figure 6:
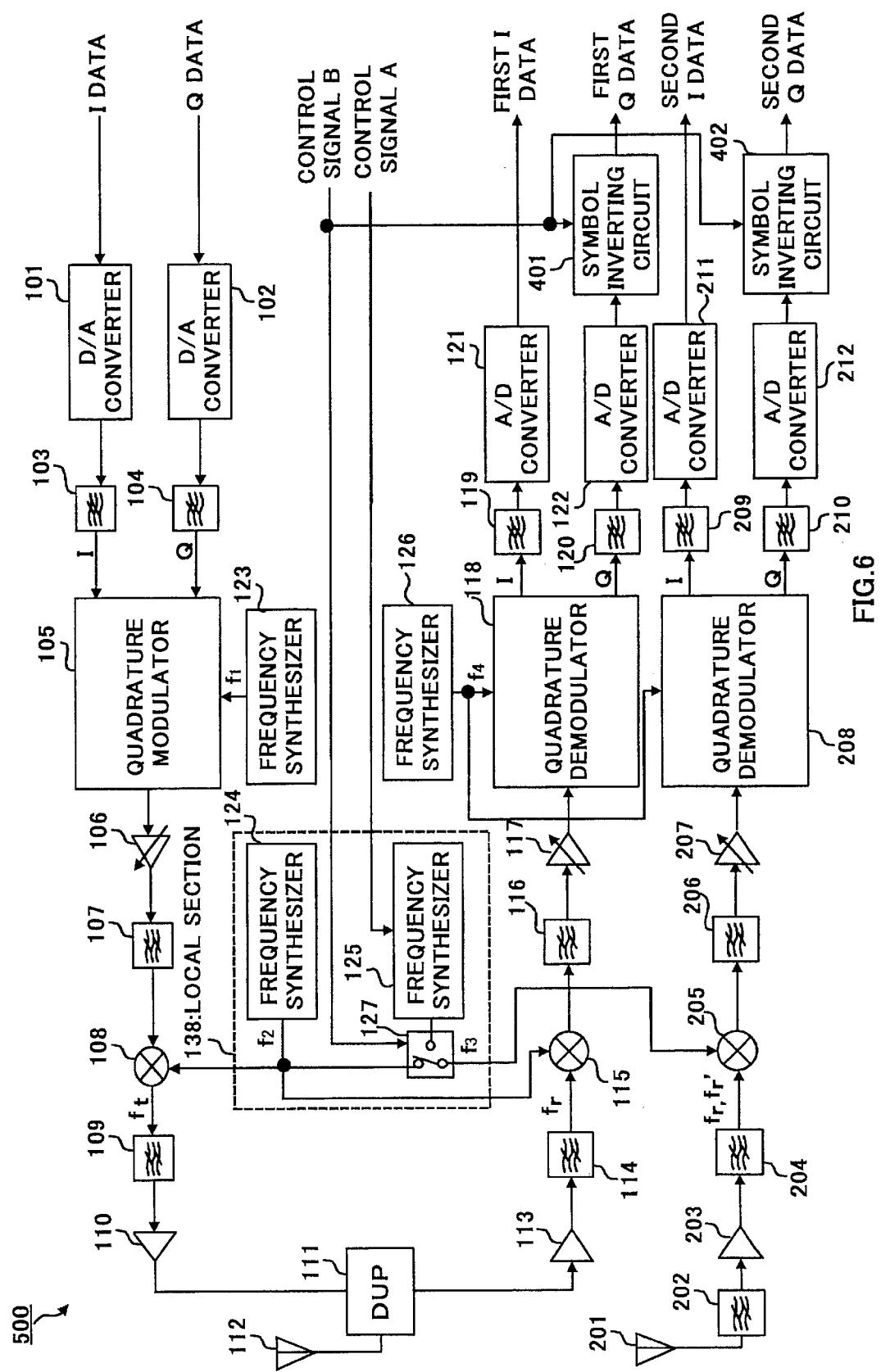
FIG. 6 is a block diagram illustrating a second configuration of a radio apparatus according to the fourth embodiment of the present invention.

That is, as radio apparatus 500 in FIG. 6, the configuration of radio apparatus 400 in FIG. 5 is given antenna 201, band-pass filter 202, low noise amplifier 203, band-pass filter 204, down-mixer 205, band-pass filter 206, gain control amplifier 207, quadrature demodulator 208, low-pass filters 209 and 210, A/D converters 211 and 212, and symbol inverting circuit 402. Then, in radio apparatus 500, down-mixer 205 is connected to switch 127, and down-mixer 115 is connected to transmission RF frequency synthesizer 124. It is thereby possible for two reception systems to receive signals with the same frequencies to perform antenna diversity.

Figure 7:
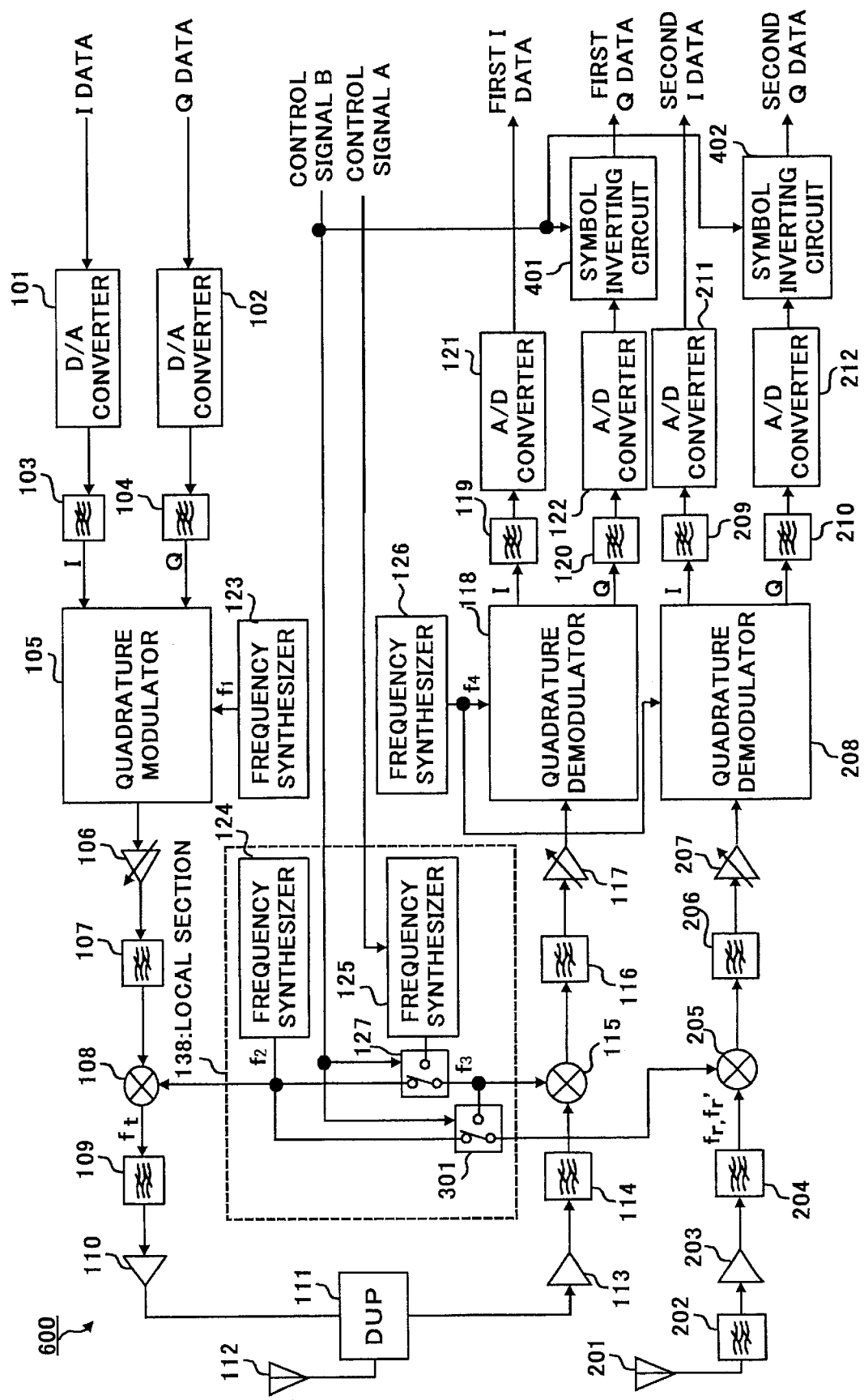
FIG. 7 is a block diagram illustrating a third configuration of a radio apparatus according to the fourth embodiment of the present invention.

Further, as radio apparatus 600 in FIG. 7, it may be possible to add switch 301 of which the switching is controlled with the control signal B to the configuration of radio apparatus 500 in FIG. 6, connect down-mixer 115 to switch 127, and further connect down-mixer 205 to switch 301. It is thereby possible to improve reception characteristics by performing diversity reception also at the time of receiving a signal with a frequency different from that in the ordinary communication besides at the time of the ordinary communication.

As explained above, according to the radio apparatus and transmission and reception method of the present invention, it is possible to switch frequencies fast and with low current consumption in receiving a signal with a reception frequency other than a combination of transmission and reception frequencies specified in an ordinary radio system.

This application is based on the Japanese Patent Application No. HEI11-097035 filed on Apr. 2, 1999, entire content of which is expressly incorporated by reference herein.

What is claimed is:

1. A radio apparatus comprising the functions of:
   combining a first frequency signal generated in a common frequency synthesizer with a quadrature modulated I signal and a quadrature modulated Q signal;
   at a time of ordinary communication, combining the first frequency signal with a received signal;
   at a time of receiving a signal of a different frequency than that of said first frequency signal, combining a received signal with a second frequency signal of a different frequency than that of the first frequency signal, generated in a reception frequency synthesizer; and
   inverting a symbol of Q data obtained by subjecting the received signal combined with the first frequency signal or the second frequency signal to quadrature demodulation and then to A/D conversion.

2. A radio apparatus comprising:

a common frequency synthesizer that generates a first frequency signal of a frequency of a combination of a transmission frequency and a reception frequency;

a reception frequency synthesizer that generates a second frequency signal of a different frequency than that of the first frequency signal and that operates only in receiving a signal of a different frequency than that of the first frequency signal;

a transmission mixer that combines the first frequency signal with a quadrature modulated I signal and a quadrature modulated Q signal for each transmission;

a reception mixer that combines a received signal with the first frequency signal or the second frequency signal;

a switch that connects said common frequency synthesizer and said reception mixer, while connecting said reception frequency synthesizer and said reception mixer only in receiving the signal of a different frequency than that of the first frequency signal; and a first symbol inverter that inverts a symbol of Q data obtained by subjecting a signal combined in the reception mixer to quadrature demodulation and then to A/D conversion.

3. The radio apparatus according to claim 2, further comprising another reception circuit having a second reception mixer that combines the first frequency signal with another received signal at another antenna to perform diversity reception.

4. The radio apparatus according to claim 3, further comprising a second switch that connects the common frequency synthesizer and the second reception mixer, while connecting the reception frequency synthesizer and the second reception mixer only in receiving the signal with the frequency different from that of the first frequency signal.

5. The radio apparatus according to claim 3, further comprising:

a second symbol inverter that inverts a symbol of Q data obtained by subjecting a signal combined in the second reception mixer to quadrature demodulation and then to A/D conversion.

6. The radio apparatus according to claim 4, further comprising:

a second symbol inverter that inverts a symbol of Q data obtained by subjecting a signal combined in the second reception mixer to quadrature demodulation and then to A/D conversion.

7. A communication terminal apparatus having a radio apparatus, said radio apparatus comprising:

a common frequency synthesizer that generates a first frequency signal of a frequency of a combination of a transmission frequency and a reception frequency;

a reception frequency synthesizer that generates a second frequency signal of a different frequency than that of the first frequency signal and that operates only in receiving a signal of a different frequency than that of the first frequency signal;

a transmission mixer that combines the first frequency signal with a quadrature modulated I signal and a quadrature modulated Q signal for each transmission;

a reception mixer that combines a received signal with the first frequency signal or the second frequency signal;

a switch that connects said common frequency synthesizer and said reception mixer, while connecting said reception frequency synthesizer and said reception mixer only in receiving the signal of a different frequency than that of the first frequency signal; and a symbol inverter that inverts a symbol of Q data obtained by subjecting a signal combined in the reception mixer to quadrature demodulation and then to A/D conversion.

8. A transmission/reception method comprising:

at a time of ordinary reception, combining a first frequency signal with a quadrature modulated I signal and a quadrature modulated Q signal in a transmission mixer, said first frequency signal being generated in a common frequency synthesizer and having a frequency of a combination of a transmission frequency and a reception frequency, and combining the first frequency signal with a received signal in a reception mixer;

at a time of receiving a signal of a different frequency than that of said first frequency signal, operating the common frequency synthesizer to generate a second frequency signal of a different frequency than that of the first frequency signal, and operating the transmission mixer to combine the second frequency signal with a received signal in said reception mixer; and inverting a symbol of Q data obtained by subjecting the received signal combined with the first frequency signal or the second frequency signal to quadrature demodulation and then to A/D conversion.

* * * * *